C. STEPHENSON.
AUTOMOBILE RUNNING BOARD.
APPLICATION FILED AUG. 4, 1920.
1,364,330.
Patented Jan. 4, 1921.
Fig. 1.
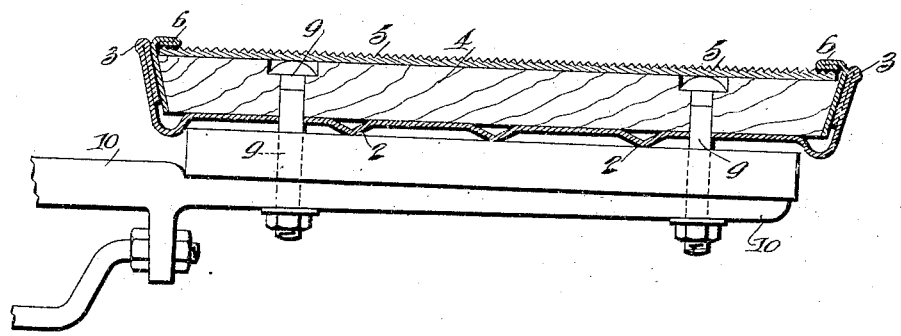
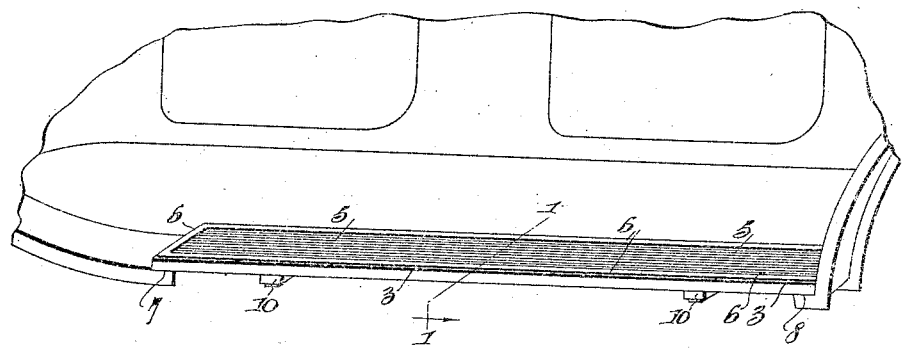
Fig. 2.
Inventor
Cyril Stephenson.
By Fred G. Dieterich
Attorney.

UNITED STATES PATENT OFFICE.

CYRIL STEPHENSON, OF NORTH VANCOUVER, BRITISH COLUMBIA, CANADA.

AUTOMOBILE RUNNING-BOARD.

1,364,330. Specification of Letters Patent. Patented Jan. 4, 1921.

Application filed August 4, 1920. Serial No. 401,220.

*To all whom it may concern:*

Be it known that I, CYRIL STEPHENSON, citizen of the Dominion of Canada, residing at North Vancouver, in the Province of British Columbia, Canada, have invented certain new and useful Improvements in Automobile Running-Boards, of which the following is a specification.

This invention relates to a running board for automobiles, and has been particularly designed as an improvement on the sheet metal running board as used in the Ford automobile. This being of sheet metal with projections embossed upward from the tread surface has, after a short time in use, a cheap and unsatisfactory appearance. The enamel rapidly wears off the tread projections and the exposed metal rusts.

In the improvement, which is the subject of this application, the metal running board of the Ford machine is used as the base on which the new running board is built. It is inverted and the space between the downwardly turned edges of the Ford running board is fitted with a filling of wood on which is secured a rubber tread plate.

The invention is fully described in the following specification, reference being made to the drawings by which it is accompanied, in which:

Figure 1 is a cross section of the improved running board on the plane 1—1 in Fig. 2, and Fig. 2, a perspective view of it as applied.

In these drawings 2 represents the tread face of the Ford running board, the normally downwardly turned edges 3 of which are turned upward.

Between these upwardly turned edges 3 is fitted a filling of wood 4 on which is a tread plate 5 of rubber or the like having the usual ridges or projections providing a non-slip surface.

This rubber facing 5 is secured to the board in any approved manner, preferably by a glue or cement, with border strips 6 nailed to the edges of the board 4, the upper edges of which strips are folded and turned inward to engage the edges of the rubber tread plate and hold them to the board. At the corners these strips are mitered and the board 4 with the rubber facing 5 secured to it fits tightly between the upwardly turned edges 3 of the inverted original running board 2, 3.

The ends of the inverted channel 2, 3 are connected at 7 and 8 to the mud guards of the front and rear wheels and intermediate of the ends the board is supported on the brackets 10 which previously supported the original running board, to which the new board is secured by coach bolts 9, the heads of which are countersunk into the upper surface of the board 4 before the tread face 5 is applied.

By this construction the existing running board of a Ford car is not only improved in appearance but is reinforced to provide a steadier and more satisfactory foot-hold, and in its reinforced strength is not so dependent on the insufficient support afforded by the brackets of the existing running board which are inadequate.

Embodying as it does the existing running board the expense of the improvement is comparatively trifling and out of all comparison with the value of the improvement.

Having now particularly described my invention, I hereby declare that what I claim as new and desire to be protected in by Letters Patent, is:

1. A running board for motor vehicles, comprising a bottom plate of sheet metal, the longitudinal edges of which are upwardly turned, a filling between the upwardly turned edges of the plate, a tread plate of rubber or the like secured to the filling, and means for securing the filling and its bottom plate to the mud guards and supporting brackets of the vehicle.

2. A running board for motor vehicles, comprising a bottom plate of sheet metal the longitudinal edges of which are upwardly turned, a board fitted between the upwardly turned edges of the plate, a tread plate of rubber or the like secured to the board filling, edge strips secured to the edges of the board and turned over the edges of the tread plate, and means for securing the board to the bottom plate and both to the mud guards and brackets of the vehicle.

3. A running board for motor vehicles, comprising a bottom plate of sheet metal having upwardly turned longitudinal edges, a board filling between the upwardly turned edges of the bottom plate and extending lengthwise thereof, a tread plate secured to the upper surface of the filling, strips of thin sheet metal secured to the edges of the board filling and folded over the edges of the tread plate, and bolts securing the filling to the bottom plate and the running board as a whole to the mud guard and supporting brackets of the vehicle.

In testimony whereof I affix my signature.

CYRIL STEPHENSON.